US008619305B2

(12) United States Patent
Rai et al.

(10) Patent No.: US 8,619,305 B2
(45) Date of Patent: Dec. 31, 2013

(54) METHODS AND SYSTEMS FOR DETERMINING SUSTAINABILITY METRICS IN A PRINT PRODUCTION ENVIRONMENT

(75) Inventors: Sudhendu Rai, Fairport, NY (US); Craig Charles Lambrecht, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 125 days.

(21) Appl. No.: 13/300,126

(22) Filed: Nov. 18, 2011

(65) Prior Publication Data

US 2013/0128303 A1    May 23, 2013

(51) Int. Cl.
*G06F 15/00* (2006.01)

(52) U.S. Cl.
USPC ........................................................ 358/1.15

(58) Field of Classification Search
USPC ........................................................ 358/1.15
See application file for complete search history.

(56) References Cited

U.S. PATENT DOCUMENTS

| | | | |
|---|---|---|---|
| 5,999,758 A | 12/1999 | Rai et al. | |
| 6,805,502 B2 | 10/2004 | Rai et al. | |
| 7,051,328 B2 | 5/2006 | Rai et al. | |
| 7,065,567 B1 | 6/2006 | Squires et al. | |
| 7,542,161 B2 | 6/2009 | Lin et al. | |
| 2006/0224440 A1 | 10/2006 | Rai | |
| 2009/0138878 A1* | 5/2009 | Fernstrom et al. | 718/102 |
| 2012/0271472 A1* | 10/2012 | Brunner et al. | 700/295 |

* cited by examiner

*Primary Examiner* — Saeid Ebrahimi Dehkordy
(74) *Attorney, Agent, or Firm* — Fox Rothschild LLP (57) ABSTRACT

A method of determining a print shop sustainability metric over a period of time may include, for each of a plurality of print devices in a print shop, determining a low-activity state sustainability metric value associated with the print device operating in one or more low-activity states over a period of time, determining a print shop low-activity state sustainability metric value associated with the print shop, and determining a processing state sustainability metric value associated with the print device operating in a processing state over the period of time, determining a print shop processing state sustainability metric value associated with the print shop, determining a print shop sustainability metric value and displaying one or more of the low-activity state sustainability metric values, the processing state sustainability metric values, the print shop sustainability metric value, the print shop processing state sustainability metric value and the print shop sustainability metric value.

16 Claims, 6 Drawing Sheets

METHODS AND SYSTEMS FOR DETERMINING SUSTAINABILITY METRICS IN A PRINT PRODUCTION ENVIRONMENT

CROSS REFERENCE TO RELATED APPLICATIONS

This application is related to U.S. patent application Ser. No. 13/300,216, filed on Nov. 18, 2011, title "Methods and Systems for Determining Heating and Air Conditioning Demands on a Print Shop".

Not Applicable

BACKGROUND

Sustainability and the desire to reduce energy consumption are becoming important corporate goals. Print shops are one of many components that contribute to the environmental impact of a corporation. However, it is often difficult to accurately estimate a print shop's energy usage without performing sophisticated job tracking or ignoring the duration of various steps in processing a customer's print job.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In an embodiment, a method of determining a print shop sustainability metric over a period of time may include for each of a plurality of print devices in a print shop, determining, by a computing device, a low-activity state sustainability metric value associated with the print device operating in one or more low-activity states over a period of time, determining, by the computing device, a print shop low-activity state sustainability metric value associated with the print shop by summing the low-activity state sustainability metric values associated with each print device in the plurality of print devices and for each print device in the plurality of print devices, determining, by the computing device, a processing state sustainability metric value associated with the print device operating in a processing state over the period of time. The method may include determining, by the computing device, a print shop processing state sustainability metric value associated with the print shop by summing the processing state sustainability metric values associated with each print device in the plurality of print devices, determining, by the computing device, a print shop sustainability metric value by summing the print shop sustainability metric value and the print shop processing state sustainability metric value and displaying one or more of the low-activity state sustainability metric values, the processing state sustainability metric values, the print shop sustainability metric value, the print shop processing state sustainability metric value and the print shop sustainability metric value.

In an embodiment, a system for determining a print shop sustainability metric over a period of time may include a computing device and a computer-readable storage medium in communication with the computing device. The computer-readable storage medium may include one or more programming instructions for, for each of a plurality of print devices in a print shop, determining a low-activity state sustainability metric value associated with the print device operating in one or more low-activity states over a period of time, determining a print shop low-activity state sustainability metric value associated with the print shop by summing the low-activity state sustainability metric values associated with each print device in the plurality of print devices, and for each print device in the plurality of print devices, determining a processing state sustainability metric value associated with the print device operating in a processing state over the period of time. The computer-readable storage medium may include one or more programming instructions for determining a print shop processing state sustainability metric value associated with the print shop by summing the processing state sustainability metric values associated with each print device in the plurality of print devices, determining a print shop sustainability metric value by summing the print shop sustainability metric value and the print shop processing state sustainability metric value, and displaying one or more of the low-activity state sustainability metric values, the processing state sustainability metric values, the print shop sustainability metric value, the print shop processing state sustainability metric value and the print shop sustainability metric value.

DETAILED DESCRIPTION

The following terms shall have, for purposes of this application, the respective meanings set forth below:

A "print device" refers to a device capable of performing one or more functions, operations and/or services on a print job. For example, a print device may provide print-related services for one or more print jobs. A print device may include a printer, a cutter, a collator, a scanner, a fax machine, a multi-function device or other similar equipment.

A "job" refers to a logical unit of work that is to be completed for a customer. In a print environment, a job may include one or more print jobs from one or more clients.

A "print job" refers to a job processed in a print production system. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "print shop" refers to an entity that includes a plurality of print devices, such as printers, cutters, collators and the like. A print shop may be a freestanding entity, including one or more print devices, or it may be part of a corporation or other entity. Additionally, a print shop may communicate with one or more servers by way of a communications network, such as the Internet, an intranet, a LAN, a WAN, a wireless network and/or the like.

A "print job function" is an operation, such as printing, binding, collating and/or the like, that is performed on a print job.

"Processing" of a print job means performing one or more print job functions on a print job to transform a print job in some manner and/or result in the display, transmission or conversion of the print job to a physical substrate.

A "low-activity state" refers to a mode of operation of a print device during which the print device does not process a print job. Examples of low-activity states may include an idle mode, a sleep mode, an off mode and/or the like.

A "processing state" refers to a mode of operation of a print device during which the print device process one or more print jobs.

A "sustainability metric" is a measurement of a print device and/or print shop's power usage and/or carbon dioxide emissions.

A "low-activity state sustainability metric value" is the amount of a sustainability metric utilized by, consumed by, generated by or otherwise associated with a print device when the print device operates in one or more low-activity states.

A "processing state sustainability metric value" is the amount of a sustainability metric utilized by, consumed by, generated by or otherwise associated with a print device when the print device operates in a processing state.

A "workflow" is a sequence of operations that are performed to complete a print job.

Figure 1:
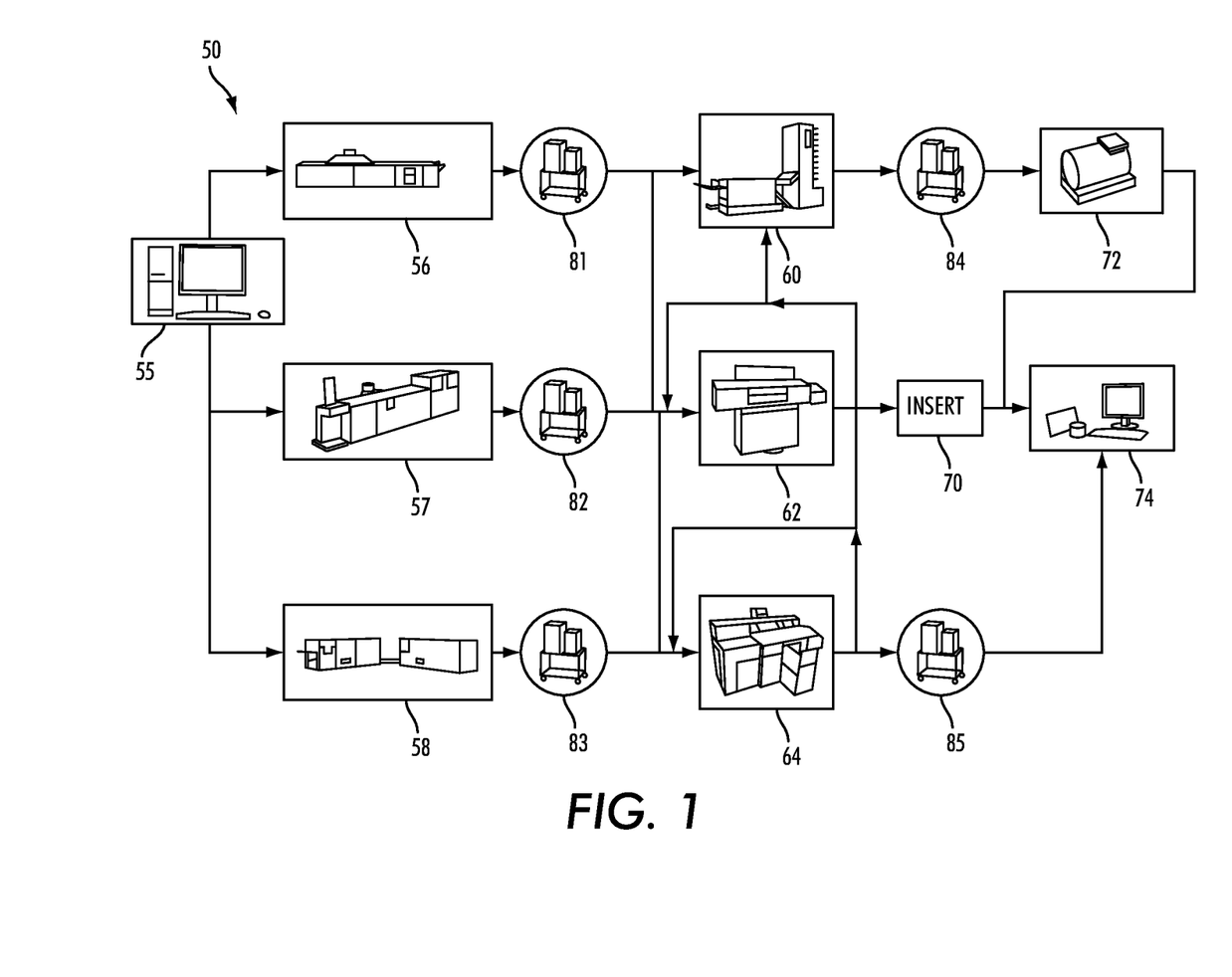
FIGS. 1 and 2 illustrate examples of print shops according to an embodiment.

FIG. 1 shows an example of a production environment 50, in this case, examples of elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85. Although the disclosed embodiments pertain to document production systems, the disclosed methods and systems can be applied to production systems in general.

Figure 2:
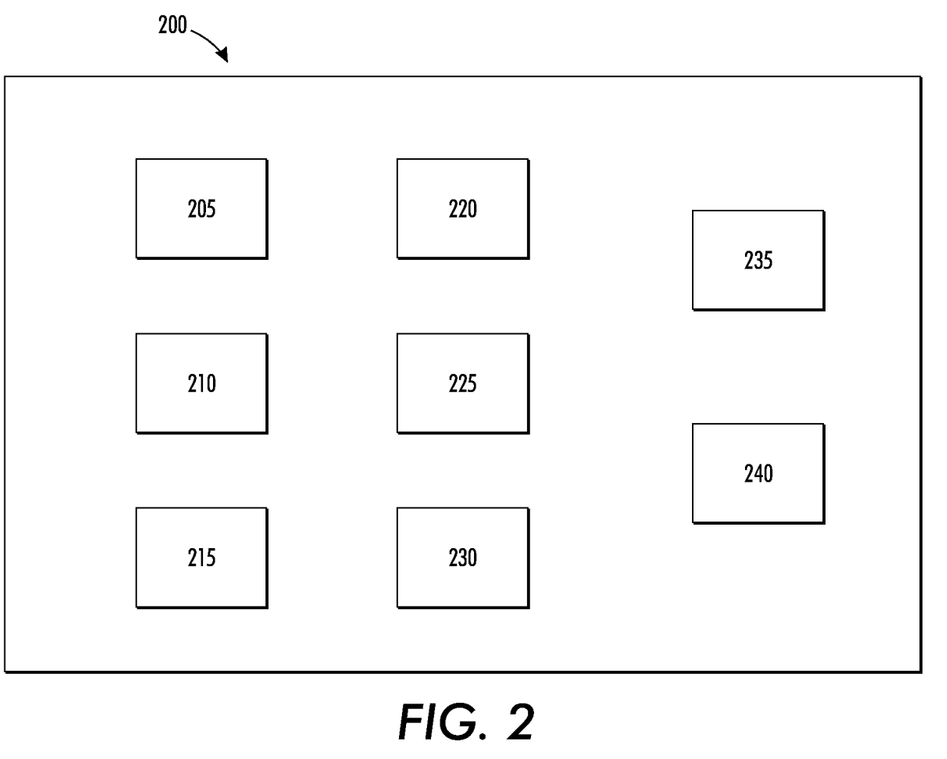

FIG. 2 illustrates a print shop according to an embodiment. As illustrated by FIG. 2, the print shop 200 includes three printers (Printer 1 205, *Printer* 2 210 and Printer 3 215), three cutters (Cutter 1 220, *Cutter* 2 225 and Cutter 3 230) and two collators (Collator 1 235 and Collator 2 240). The print shop illustrated in FIG. 2 will serve as the basis for examples discussed in this application, but it is understood that additional and/or alternate print shops and print shop configurations may be used within the scope of this disclosure.

Figure 3:
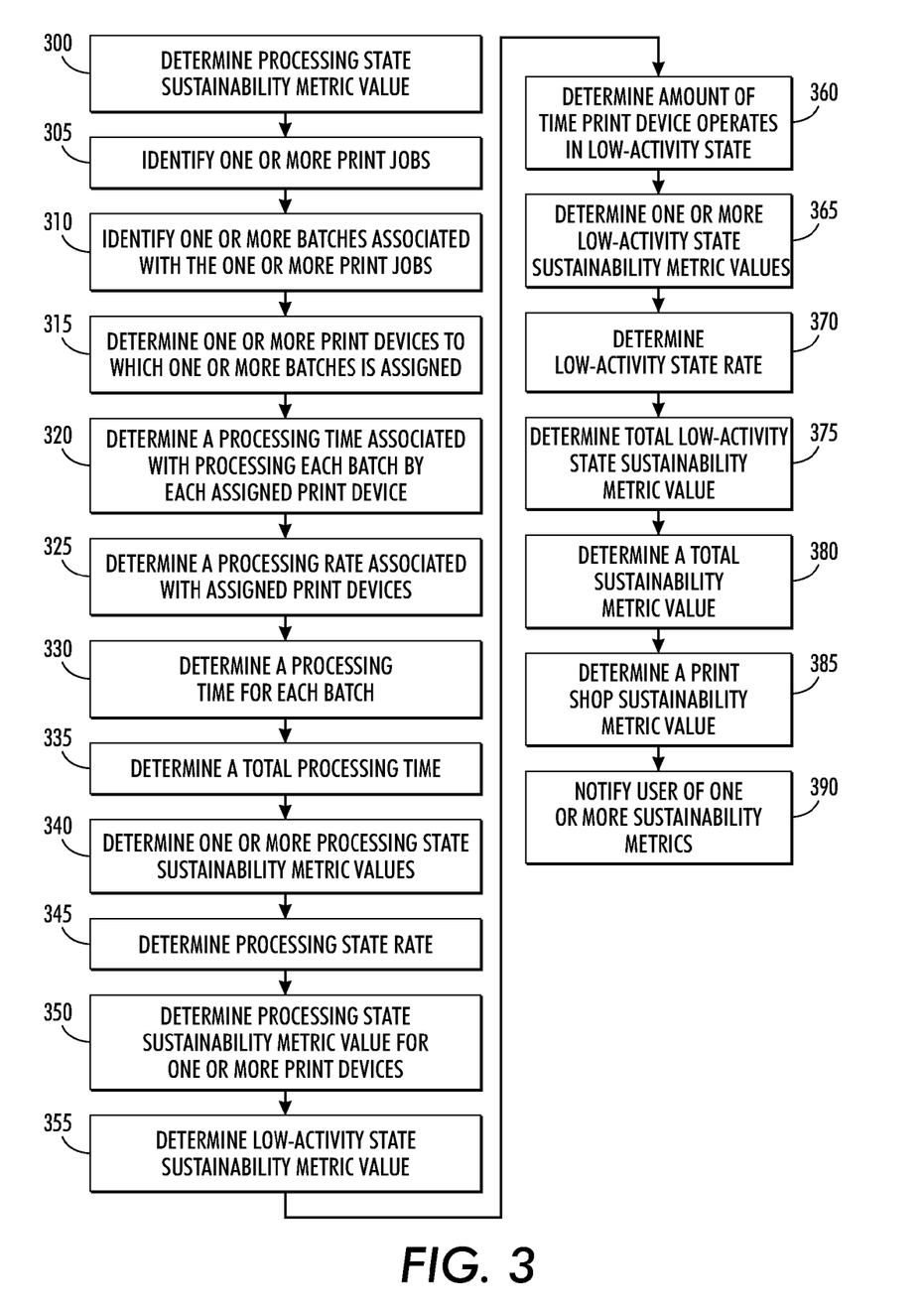
FIG. 3 illustrates a method of estimating one or more sustainability metrics of a print shop according to an embodiment.

FIG. 3 illustrates a method of estimating one or more sustainability metrics of a print shop according to an embodiment. As illustrated by FIG. 3, a processing state sustainability metric value associated with one or more print devices in a print shop over a period of time may be determined 300. For example, a processing state power usage associated with one or more print devices may be determined 300. A processing state power usage may be an amount of energy used by a print device when the print device operates in a processing state.

In an embodiment, one or more print jobs may be identified 305. In an embodiment, the identified print jobs may be ones that have been processed by a print shop. In an embodiment, the identified print jobs may be ones that have not been processed by a print shop, but for which one or more processing state sustainability metric values associated with processing the identified print jobs by a print shop are to be determined. In an embodiment, one or more print jobs may be identified by receiving information identifying the print jobs from a computing device, a print device, a database and/or the like. This information may include a log associated with one or more print devices and/or the like.

In an embodiment, an identified print job may have an associated workflow. The workflow may specify operations to perform on the print job and the order in which the operations are to be performed. For example, a workflow associated with a print job may indicate that the print job is to be printed, cut and bound.

In an embodiment, one or more batches associated with one or more print jobs may be identified 310. In an embodiment, one or more batches associated with a print job may be identified 310 based on a workflow associated with the print job. A batch may be a smaller-sized subcomponent of a print job. A print job may be split into batches to expedite processing of a print job. For example, batches may be concurrently processed to achieve a higher overall utilization of resources in a print shop and faster turnaround times for print jobs. In an embodiment, a batch may have a corresponding batch size. The batch size may be chosen to decrease the total time it takes a print shop to process the print job.

In an embodiment, one or more print devices in a print shop to which one or more batches is assigned to be processed may be determined 315. For example, each batch may be scheduled, assigned and/or the like to one or more print devices in a print shop to be processed. The print devices to which a batch is assigned may be based on the print device's capabilities, availability and/or the like. Methods for determining optimal batch-sizes and scheduling of print jobs are also known in the art and described in, for example, U.S. Pat. Nos. 5,999,758, 7,065,567, 7,051,328, 6,805,502 and 7,542,161, the disclosures of which are incorporated by reference in their entireties.

Table 3 illustrates a table of identified print jobs, batches, batch sizes and assigned print devices of the print shop illustrated in FIG. 2 according to an embodiment.

TABLE 3

| Print Job | Batches | Batch Size (pages) | Assigned Print Devices |
|---|---|---|---|
| Print Job 1 | Batch 1 | 5,000 | Printer 1 |
| | | | Collator 1 |
| | Batch 2 | 7,500 | Printer 2 |
| | | | Collator 2 |

TABLE 3-continued

| Print Job | Batches | Batch Size (pages) | Assigned Print Devices |
|---|---|---|---|
| Print Job 2 | Batch 1 | 3,500 | Printer 1 |
| | | | Cutter 1 |
| | | | Collator 1 |
| | Batch 2 | 3,000 | Printer 2 |
| | | | Cutter 2 |
| | | | Collator 2 |
| | Batch 3 | 2,500 | Printer 3 |
| | | | Cutter 3 |
| | | | Collator 1 |
| Print Job 3 | Batch 1 | 2,700 | Printer 1 |
| | | | Cutter 1 |
| | Batch 2 | 6,600 | Printer 3 |
| | | | Cutter 2 |

In an embodiment, a processing time associated with processing each batch of an identified print job by each assigned print device may be determined 320. For example, referring to Table 3, a processing time associated with processing Print Job 1 may be determined 320 by determining the processing time associated with processing Batch 1 by Printer 1 and Collator 1, and Batch 2 by Printer 2 and Collator 2.

In an embodiment, a processing rate associated with one or more assigned print devices may be determined 325. For example, a processing rate associated with a print device may be retrieved from a database or other storage medium. Table 4 illustrates processing rates associated with the print devices identified in Table 3 according to an embodiment.

TABLE 4

| Print Device | Processing Rate |
|---|---|
| Printer 1 | 1500 pages/hour |
| Printer 2 | 2100 pages/hour |
| Printer 3 | 1800 pages/hour |
| Cutter 1 | 2500 pages/hour |
| Cutter 2 | 2700 pages/hour |
| Cutter 3 | 2650 pages/hour |
| Collator 1 | 1600 pages/hour |
| Collator 2 | 1700 pages/hour |

In an embodiment, a processing time associated with processing a batch may be determined 330 for each print device to which the batch is assigned. In an embodiment, a processing time associated with processing a batch by a print device may be determined 330 by dividing the batch size of the batch by the processing rate associated with the print device. For example, referring to Tables 3 and 4, a processing time associated with processing Batch 1 of Print Job 1 by Printer 1 may be determined 330 by dividing the processing rate associated with Printer 1 by the batch size of Batch 1

$$\left(\text{i.e., } \frac{5{,}000 \text{ pages}}{1500 \text{ pages/hr}} = 3.33 \text{ hours}\right).$$

Table 5 illustrates examples of processing times for each batch and print job illustrated in Table 3 according to an embodiment.

TABLE 5

| Print Job | Batches | Print Device | Processing Time (hours) |
|---|---|---|---|
| Print Job 1 | Batch 1 | Printer 1 | 3.33 |
| | | Collator 1 | 3.125 |

TABLE 5-continued

| Print Job | Batches | Print Device | Processing Time (hours) |
|---|---|---|---|
| | Batch 2 | Printer 2 | 3.57 |
| | | Collator 2 | 4.41 |
| Print Job 2 | Batch 1 | Printer 1 | 2.33 |
| | | Cutter 1 | 1.4 |
| | | Collator 1 | 2.18 |
| | Batch 2 | Printer 2 | 1.42 |
| | | Cutter 2 | 1.11 |
| | | Collator 2 | 1.76 |
| | Batch 3 | Printer 3 | 1.38 |
| | | Cutter 3 | 0.94 |
| | | Collator 1 | 1.56 |
| Print Job 3 | Batch 1 | Printer 1 | 1.8 |
| | | Cutter 1 | 1.08 |
| | Batch 2 | Printer 3 | 3.66 |
| | | Cutter 2 | 2.44 |

In an embodiment, a total processing time associated with processing the identified print jobs may be determined 335 for one or more print devices in a print shop. A total processing time for a print device may be determined 335 by summing the processing times associated with each batch that is assigned to the print device. For example, referring to Table 5, a total processing time associated with Printer 1 may be the sum of the processing times of Print Job 1/Batch 1, Print Job 2/Batch 1 and Print Job 3/Batch 1 (i.e., 3.33+2.33+1.80=7.46 hours). Table 6 illustrates examples of total processing times for the print devices illustrated in Table 4 according to an embodiment.

TABLE 6

| Print Device | Total Processing Time (hours) |
|---|---|
| Printer 1 | 7.46 |
| Printer 2 | 4.99 |
| Printer 3 | 5.04 |
| Cutter 1 | 2.48 |
| Cutter 2 | 3.55 |
| Cutter 3 | 0.94 |
| Collator 1 | 6.87 |
| Collator 2 | 6.17 |

In an embodiment, one or more processing state sustainability metrics associated with one or more print devices may be determined 340. The processing state sustainability metrics may be based on the total processing times associated with one or more print devices over a period of time. In an embodiment, a processing state rate associated with a processing state sustainability metric may be determined 345. For example, a processing state rate may be a power usage rate or a carbon dioxide emission rate. In an embodiment, a processing state rate may be specific to a print device, a print device model, a print device type and/or the like. A processing state rate may be determined 345 by retrieving the processing state rate from a database, a print device and/or other storage medium. In an embodiment, a processing state rate may be a rate associated with a print device, a print device type, a print device model and/or the like. In an embodiment, a processing state rate may be an average rate associated with a print device, a print device type, a print device model and/or the like.

In an embodiment, a processing state sustainability metric value for one or more print devices may be determined 350. For example, a processing state sustainability metric value may be determined 350 by multiplying the determined processing state rate by the total processing time associated with a print device.

For example, a processing state power usage associated with a print device may be determined by multiplying a power usage rate associated with the print device by the total processing time associated with the print device. For instance, if a power usage rate associated with Printer 1 of Table 6 is 23 Watts/hour, a processing state power usage associated with Printer 1 during the processing of Print Job 1, Print Job 2 and Print Job 3 may be 171.58 Watts (i.e., 23 Watts/hour*7.46 hours). Table 7 illustrates examples of processing state power usages for the print devices illustrated in FIG. 2 according to an embodiment.

TABLE 7

| | Processing State | | |
|---|---|---|---|
| Print Device | Total Processing Time (hours) | Power Usage Rate (W/hour) | Total Power Usage (W) |
| Printer 1 | 7.46 | 23 | 171.58 |
| Printer 2 | 4.99 | 25 | 124.75 |
| Printer 3 | 5.04 | 19 | 95.76 |
| Cutter 1 | 2.48 | 9 | 22.32 |
| Cutter 2 | 3.55 | 11 | 39.05 |
| Cutter 3 | 0.94 | 10 | 9.40 |
| Collator 1 | 6.87 | 15 | 103.05 |
| Collator 2 | 6.17 | 17 | 104.89 |

In an embodiment, a processing state carbon dioxide emissions level associated with a print device may be determined. A processing state carbon dioxide emissions level may be an amount of carbon dioxide emitted by a print device while the print device is operating in a processing state for a period of time. In an embodiment, a processing state carbon dioxide emissions level may be determined by multiplying a carbon dioxide emissions rate associated with a print device by the total processing time of the print device. For example, if a carbon dioxide emission rate associated with Cutter 2 of is 60 g/hour, a processing state carbon dioxide emission level associated with Cutter 2 during the processing of Print Job 1, Print Job 2 and Print Job 3 may be 213 g (i.e., 60 g/hour*3.55 hours). Table 8 illustrates examples of processing state carbon dioxide emissions levels for the print devices illustrated in FIG. 2 according to an embodiment.

TABLE 8

| Print Device | Total Processing Time (hours) | Carbon Dioxide Emission Rate (g/hour) | Total Carbon Dioxide Emission Level (g) |
|---|---|---|---|
| Printer 1 | 7.46 | 30 | 223.8 |
| Printer 2 | 4.99 | 70 | 349.3 |
| Printer 3 | 5.04 | 40 | 201.6 |
| Cutter 1 | 2.48 | 80 | 198.4 |
| Cutter 2 | 3.55 | 60 | 213 |
| Cutter 3 | 0.94 | 20 | 18.8 |
| Collator 1 | 6.87 | 50 | 343.5 |
| Collator 2 | 6.17 | 60 | 370.2 |

In an embodiment, a low-activity state sustainability metric value associated with one or more print devices in a print shop over a period of time may be determined 355. In an embodiment, a low-activity state sustainability metric value associated with a print device may be determined by analyzing a schedule associated with the print shop. In an embodiment, a schedule may reflect one or more period of times when a print device is operating in a processing state and/or one or more periods of time when the print device is operating in a low-activity state.

For example, a schedule for the print shop illustrated in FIG. 2 may show that the print shop operates between the hours of 8 a.m. and 5 p.m. The schedule may show that during this time, the print shop processed Print Job 1, Print Job 2 and Print Job 3. The schedule may show that for the period of time between 8 a.m. and 5 p.m. when the print shop was not processing Print Job 1, Print Job 2 or Print Job 3, the print devices were operating in idle mode. In an embodiment, the schedule may show that during the period from 5 p.m. to 8 a.m. the print devices in the print shop operated in sleep mode.

In an embodiment, an amount of time that one or more print devices in a print shop operate in a low-activity state may be determined 360. For example, an amount of time that a print device operated in each of an idle mode, a sleep mode and an off mode may be determined 360 based on an associated schedule.

For example, the schedule for the print shop of FIG. 2 may indicate that the print shop only processed Print Job 1, Print Job 2 and Print Job 3 in a 24-hour period of time. As such, during the period of time between 8 a.m. and 5 p.m. when the print shop was not processing Print Job 1, Print Job 2 or Print Job 3, the print shop was operating in an idle mode. A total time each print device operated in idle mode may be determined by determining the difference between the time the print shop operates (i.e., between 8 a.m. and 5 p.m) and the processing time associated with the print device for processing Print Job 1, Print Job 2 and Print Job 3 (i.e., Table 6). For example, the print shop illustrated in FIG. 2 operates for 9 hours in a 24-hour period. As such, the amount of time that Printer 1 is idle between 8 a.m. and 5 p.m is equal to the difference between the total operating time of the print shop and the total processing time of Printer 1 (i.e., 9 hours−7.46 hours=1.54 hours).

Similarly, an amount of time that one or more print devices spends in other low-activity states may be determined. For example, an amount of time that a print device operates in sleep mode or is powered off may be determined. For instance, the schedule associated with the print shop illustrated in FIG. 2 may indicate that all of the print devices in the print shop operate in sleep mode between the hours of 5 p.m. and 8 a.m. As such, each print device in the print shop operates in sleep mode for 15 hours. Table 11 illustrates examples of low-activity state times associated with the print devices shown in FIG. 2.

TABLE 11

| Print Device | Total Time - Idle Mode (hours) | Total Time - Sleep Mode (hours) | Total Time - Off (hours) |
|---|---|---|---|
| Printer 1 | 1.54 | 15 | 0 |
| Printer 2 | 4.01 | 15 | 0 |
| Printer 3 | 3.96 | 15 | 0 |
| Cutter 1 | 6.52 | 15 | 0 |
| Cutter 2 | 5.45 | 15 | 0 |
| Cutter 3 | 8.06 | 15 | 0 |
| Collator 1 | 2.14 | 15 | 0 |
| Collator 2 | 2.83 | 15 | 0 |

In an embodiment, one or more low-activity state sustainability metric values associated with one or more print devices may be determined 365. The low-activity state sustainability metric values may be based on one or more low-activity state operating times associated with one or more print devices over a period of time. In an embodiment, a low-activity state rate associated with a low-activity state sustainability metric may be determined 370. For example, a low-activity state rate may be a power usage rate or a carbon dioxide emission rate. For example, an idle rate may be a low-activity state rate associated with a low-activity state metric corresponding to a print device operating in idle mode. Similarly, a sleep rate may be a low-activity state rate associated with a low-activity state metric corresponding to a print device operating in sleep mode, and an off rate may be a low-activity state rate associated with a low-activity state metric corresponding to a print device operating in off mode.

In an embodiment, a low-activity state rate may be specific to a print device, a print device model, a print device type and/or the like. A low-activity state rate may be determined 370 by retrieving the rate from a database or other storage medium. In an embodiment, a low-activity state sustainability metric may be determined by multiplying the determined low-activity state rate by the low-activity state operating time associated with a print device.

In an embodiment, a total low-activity state sustainability metric value may be determined 375 by a print device by summing the low-activity state sustainability metrics for each low-activity state in which the print device operates. For example, a total low-activity state sustainability metric value may be determined 375 by summing the sustainability metrics associated with the print device operating in an idle mode, a sleep mode and/or an off mode.

For example, a low-activity state power usage associated with a print device may be determined for one or more low-activity states, such as an idle mode, a sleep mode, an off mode and/or the like. A low-activity state power usage may be determined by multiplying a power usage rate for a print device operating in a low-activity state by the amount of time the print devices operates in that low-activity state. For instance, if a power usage rate associated with Printer 1 when it operates in idle mode is 215 Watts/hour, a low-activity state power usage associated with Printer 1 when Printer 1 operates in idle mode during the processing of Print Job 1, Print Job 2 and Print Job 3 may be 331.1 Watts (i.e., 215 Watts/hour*1.54 hours). If a low-activity state power usage associated with Printer 1 when it operates in sleep mode is 0.15 Watts, and a low-activity state power usage associated with Printer 1 when it operates in off mode is 0 Watts, a total low-activity state power usage associated with Printer 1 may be 331.25 Watts (1331.1+0.15+0). Table 12 illustrates examples of low-activity state power usages for the print devices illustrated in FIG. 2 according to an embodiment.

TABLE 12

| | Low-activity state Power Usage (Watts) | | | | | | | | |
|---|---|---|---|---|---|---|---|---|---|
| | Idle | | | Sleep | | | Off | | |
| Print Device | Idle Power Rate (W/hour) | Idle Time (hour) | Idle Power Usage (W) | Sleep Power Rate (W/hour) | Sleep Time (hour) | Sleep Power Usage (W) | Off Power Rate (W/hour) | Off Time (hour) | Off Power Usage (W) |
| Printer 1 | 2.00 | 1.54 | 3.08 | 0.01 | 15 | 0.15 | 0.00 | 0 | 0 |
| Printer 2 | 3.00 | 4.01 | 12.03 | 0.01 | 15 | 0.15 | 0.00 | 0 | 0 |
| Printer 3 | 4.00 | 3.96 | 15.84 | 0.02 | 15 | 0.30 | 0.00 | 0 | 0 |
| Cutter 1 | 1.50 | 6.52 | 9.78 | 0.01 | 15 | 0.15 | 0.00 | 0 | 0 |
| Cutter 2 | 1.75 | 5.45 | 9.54 | 0.03 | 15 | 0.45 | 0.00 | 0 | 0 |
| Cutter 3 | 1.00 | 8.06 | 8.06 | 0.01 | 15 | 0.15 | 0.00 | 0 | 0 |
| Collator 1 | 3.00 | 2.14 | 6.42 | 0.05 | 15 | 0.75 | 0.00 | 0 | 0 |
| Collator 2 | 3.20 | 2.83 | 9.06 | 0.02 | 15 | 0.30 | 0.00 | 0 | 0 |

In an embodiment, a low-activity state carbon dioxide emissions level associated with a print device may be determined for one or more low-activity states, such as an idle mode, a sleep mode, an off mode and/or the like. A low-activity state carbon dioxide emissions level may be determined by multiplying a carbon dioxide emissions rate for a print device operating in a low-activity state by the amount of time the print devices operates in that low-activity state. For instance, if a carbon dioxide emissions rate associated with Printer 1 when it operates in idle mode is 5 g/hour, a low-activity state power usage associated with Printer 1 when Printer 1 operates in idle mode during the processing of Print Job 1, Print Job 2 and Print Job 3 may be 7.7 g (i.e., 5 g/hour*1.54 hours). If a low-activity state carbon dioxide emissions level associated with Printer 1 when it operates in sleep mode is 15 g, and a low-activity state carbon dioxide emissions level associated with Printer 1 when it operates in off mode is 0 g, a total low-activity state carbon dioxide emissions level associated with Printer 1 may be 22.7 g (7.7+ 15+0). Table 13 illustrates examples of low-activity state power usages for the print devices illustrated in FIG. 2 according to an embodiment.

TABLE 13

| | Low-activity state Carbon Dioxide Emissions Level (kg) | | | | | | | | |
|---|---|---|---|---|---|---|---|---|---|
| | Idle | | | Sleep | | | Off | | |
| Print Device | Idle Emissions Rate (g/hour) | Idle Time (hour) | Idle Emissions Level (g) | Sleep Emissions Rate (g/hour) | Sleep Time (hour) | Sleep Emissions Level (g) | Off Emissions Rate (g/hour) | Off Time (hour) | Off Emissions Level (g) |
| Printer 1 | 5 | 1.54 | 7.7 | 1 | 15 | 15 | 0.01 | 0 | 0 |
| Printer 2 | 3 | 4.01 | 12.03 | 2 | 15 | 30 | 0.01 | 0 | 0 |
| Printer 3 | 3 | 3.96 | 11.88 | 1 | 15 | 15 | 0.03 | 0 | 0 |
| Cutter 1 | 4 | 6.52 | 26.08 | 0.50 | 15 | 7.50 | 0.02 | 0 | 0 |
| Cutter 2 | 3 | 5.45 | 16.35 | 1 | 15 | 15 | 0.01 | 0 | 0 |
| Cutter 3 | 2 | 8.06 | 16.12 | 1.50 | 15 | 22.5 | 0.02 | 0 | 0 |
| Collator 1 | 5 | 2.14 | 10.7 | 1 | 15 | 15 | 0.02 | 0 | 0 |
| Collator 2 | 3 | 2.83 | 8.49 | 0.50 | 15 | 7.50 | 0.01 | 0 | 0 |

In an embodiment, a total sustainability metric value may be determined 380 for one or more print devices in a print shop. A total sustainability metric value may be the sum of the total low-activity state metric value and the total processing state metric value associated with the print device. For example, a total power usage associated with Printer 1 as illustrated in FIG. 2 may be the sum of the low-activity state power usage associated with Printer 1 and the processing state power usage associated with Printer 1. Table 14 illustrates examples of total sustainability metric values associated with the print devices illustrated in FIG. 2 according to an embodiment.

TABLE 14

| | Power Usage (Watts) | | | Carbon Dioxide Emissions (kg) | | |
|---|---|---|---|---|---|---|
| Print Device | Low-activity state | Pro-cessing State | Total | Low-activity state | Pro-cessing State | Total |
| Printer 1 | 3.23 | 171.58 | 174.81 | 22.7 | 223.8 | 246.50 |
| Printer 2 | 12.18 | 124.75 | 136.93 | 42.03 | 349.3 | 381.33 |
| Printer 3 | 16.14 | 95.76 | 111.90 | 26.88 | 201.6 | 228.48 |
| Cutter 1 | 9.93 | 22.32 | 32.25 | 33.58 | 198.4 | 231.98 |
| Cutter 2 | 9.99 | 39.05 | 49.04 | 31.35 | 213 | 244.35 |
| Cutter 3 | 8.21 | 9.40 | 17.61 | 38.62 | 18.8 | 57.42 |
| Collator 1 | 7.17 | 103.05 | 110.22 | 25.7 | 343.5 | 349.2 |
| Collator 2 | 9.36 | 104.89 | 114.25 | 15.99 | 370.2 | 386.19 |
| Print Shop Total | | | 747.01 | | | 2,125.45 |

In an embodiment, a print shop sustainability metric value may be determined 385 for a print shop. A print shop sustainability metric value may be determined 385 by summing the total sustainability metric values associated with each print device in the print shop. For example, a power usage for the print shop illustrated in FIG. 2 may be determined by summing the total power usage (in both low-activity state and processing state) for each print device in the print shop.

Figure 4:
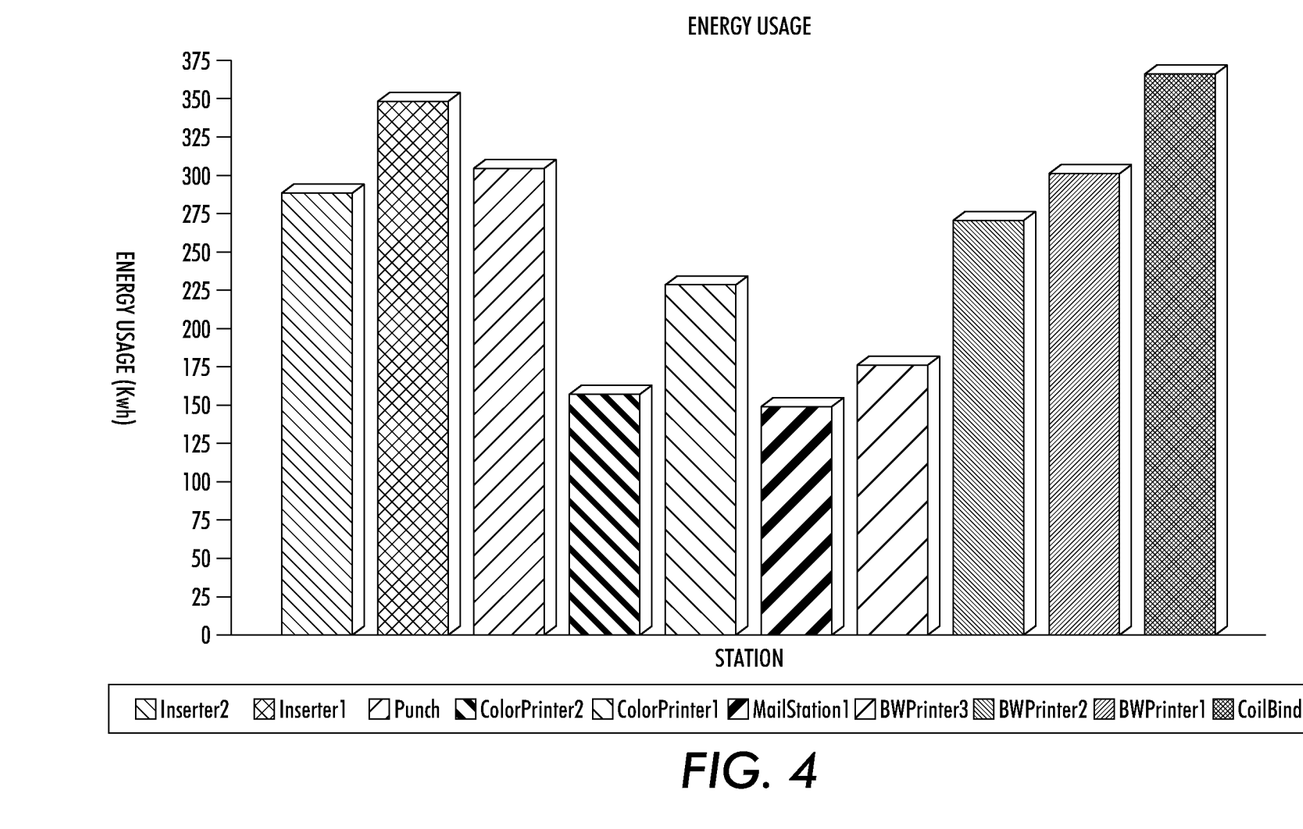
FIG. 4 illustrates a bar graph showing power usages associated with print devices in a print shop according to an embodiment.

In an embodiment, one or more users may be notified 390 of one or more sustainability metrics, one or more print shop sustainability metrics and/or the like. In an embodiment, this information may be emailed to a user. Alternatively, this information may be displayed to a user on a display device, such as a computer monitor. The information may be presented as one or more charts, graphs, lists and/or the like. For example, FIG. 4 illustrates a bar graph showing the power usage associated with print devices in a print shop according to an embodiment.

Figure 5:
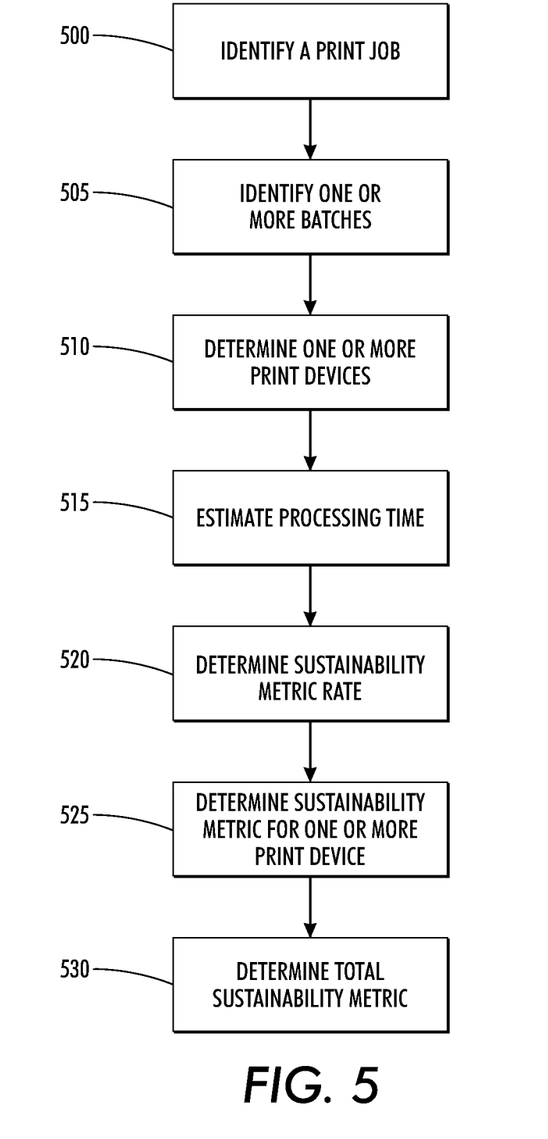
FIG. 5 illustrates a method of estimating one or more sustainability metrics according to an embodiment.

In an embodiment, a print shop sustainability metric value may be estimated for a processing a print job. FIG. 5 illustrates a method of estimating a sustainability metric according to an embodiment. As illustrated by FIG. 5, a print job may be identified 500. A print job may be identified 500 in any of the ways previously discussed. In an embodiment, one or more batches associated with a print job may be identified 505 in any of the ways previously discussed.

In an embodiment, one or more print devices to which the print job or one or more batches associated with the print job are assigned may be determined 510. In an embodiment, the print device or devices to which a batch is assigned may be based on the print device's capabilities, availability and/or the like.

For example, if a 6,000 page print job that needs to be printed is identified 500, print devices that are available and capable of printing may be determined 510. For instance, two printers may be available at the time the identified print job is to be processed. The first printer may have a processing rate of 2,000 pages/hour and the second printer may have a processing rate of 4,000 pages/hour. In an embodiment, the print job may be split into two batches; one to be processed by the first printer, and one to be processed by the second printer. For example, the print job may be split into a batch of 4,000 pages and a batch of 2,000 pages. The 2,000 page batch may be assigned to the first printer, and the second batch may be assigned to the second printer.

In an embodiment, a processing time for each print device to which a batch is assigned may be estimated 515. In an embodiment, the processing time may be estimated 515 by dividing the processing rate associated with the print device by the size of the batch assigned to the print device. For instance, referring to the previous example, the processing time for the first printer may be estimated 515 at one hour, and the processing time for the second printer may be estimated at one hour.

In an embodiment, a sustainability metric rate may be determined 520 for one or more of the print devices to which one or more batches are assigned. For example, the sustainability metric rate may be a power usage rate or a carbon dioxide emission rate. A sustainability metric rate may be determined 520 by retrieving the rate from a database, a print device and/or other storage medium.

In an embodiment, a sustainability metric associated with one or more of the print devices to which one or more batches are assigned may be determined 525. A sustainability metric may be determined 525 by multiplying the sustainability metric rate associated with the print device by the estimated processing time associated with the print device. For example, if the power usage rate associated with the first printer from the above example is 20 W/hour, the power usage associated with the first printer processing the print job may be 20 W (i.e., 20 W/hour*1 hour). Similarly, if the power usage rate associated with the second printer is 21 W/hour, the power usage associated with the second printer processing the print job may be 21 W (i.e., 21 W/hour*1 hour).

In an embodiment, a total sustainability metric may be determined 530 for a processing a print job. In an embodiment, a total sustainability metric may be determined 530 by summing the sustainability metrics associated with each print device that processed a batch. For example, in the above example, a total sustainability metric may be 41 W (i.e., 20 W+21 W).

Figure 6:
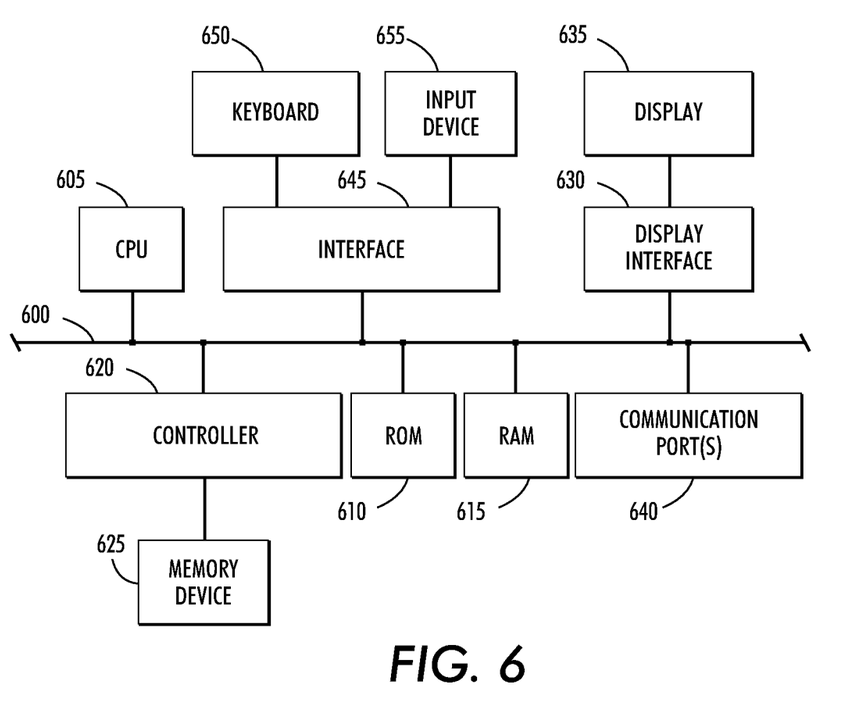
FIG. 6 illustrates a block diagram of internal hardware that may be used to contain or implement program instructions according to an embodiment.

FIG. 6 depicts a block diagram of internal hardware that may be used to contain or implement program instructions according to an embodiment. A bus 600 serves as the main information highway interconnecting the other illustrated components of the hardware. CPU 605 is the central processing unit of the system, performing calculations and logic operations required to execute a program. Read only memory (ROM) 610 and random access memory (RAM) 615 constitute exemplary memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions may be stored in the ROM 610 and/or the RAM 615. Optionally, program instructions may be stored on a tangible computer readable storage medium such as a hard disk, compact disk, a digital disk, flash memory, a memory card, a USB drive, an optical disc storage medium, such as Blu-ray™ disc, and/or other recording medium.

An optional display interface 630 may permit information from the bus 600 to be displayed on the display 635 in audio, visual, graphic or alphanumeric format. Communication with external devices may occur using various communication ports 640. An exemplary communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of determining a print shop sustainability metric over a period of time, the method comprising:
  for each of a plurality of print devices in a print shop, determining, by a computing device, a low-activity state sustainability metric value associated with the print device operating in one or more low-activity states over a period of time;
  determining, by the computing device, a print shop low-activity state sustainability metric value associated with the print shop by summing the low-activity state sustainability metric values associated with each print device in the plurality of print devices;
  for each print device in the plurality of print devices, determining, by the computing device, a processing state sustainability metric value associated with the print device operating in a processing state over the period of time by;
    determining a processing time associated with the print device, wherein the processing time comprises an amount of time the print device processes one or more print jobs during the period of time,
    determining a processing rate associated with the print device, wherein the processing state rate comprises a measurement of the sustainability metric associated with the print device operating in a processing state over a second period of time, and
    multiplying the processing time by the processing rate;
  determining, by the computing device, a print shop processing state sustainability metric value associated with the print shop by summing the processing state sustainability metric values associated with each print device in the plurality of print devices;
  determining, by the computing device, a print shop sustainability metric value by summing the print shop sustainability metric value and the print shop processing state sustainability metric value; and
  displaying one or more of the low-activity state sustainability metric values, the processing state sustainability metric values, the print shop sustainability metric value, the print shop processing state sustainability metric value and the print shop sustainability metric value.

2. The method of claim 1, wherein determining a low-activity state sustainability metric value associated with the print device comprises
  determining an idle time associated with the print device, wherein the idle time comprises an amount of time that the print device operates in idle mode over the period of time;
  determining an idle rate associated with the print device, wherein the idle rate comprises a measurement of the sustainability metric associated with the print device operating in idle mode over a second period of time;
  determining an idle sustainability metric value by multiplying the idle time and the idle rate;
  determining a sleep time associated with the print device, wherein the sleep time comprises an amount of time that the print device operates in sleep mode over the period of time;
  determining a sleep rate associated with the print device, wherein the sleep rate comprises a measurement of the sustainability metric associated with the print device operating in sleep mode over the second period of time;
  determining a sleep sustainability metric value by multiplying the sleep time and the sleep rate;
  determining an off time associated with the print device, wherein the off time comprises an amount of time that the print device operates in off mode over the period of time;
  determining an off rate associated with the print device, wherein the off rate comprises a measurement of the sustainability metric associated with the print device operating in off mode over the second period of time;
  determining an off sustainability metric value by multiplying the off time and the off rate;

summing the idle sustainability metric value, the sleep sustainability metric value and the off sustainability metric value.

3. The method of claim 2, wherein determining an idle time comprises identifying an amount of time the print device operates in idle mode during the period of time from a schedule associated with the print shop.

4. The method of claim 2, wherein determining a sleep time comprises identifying an amount of time the print device operates in sleep mode during the period of time from a schedule associated with the print shop.

5. The method of claim 2, wherein determining an off time comprises identifying an amount of time the print device operates in off mode during the period of time from a schedule associated with the print shop.

6. The method of claim 1, wherein determining a processing time comprises:
identifying a print job to be processed by the print shop during the period of time;
identifying a plurality of batches associated with the print job, wherein each batch has a corresponding batch size;
identifying one or more batches assigned to the print device;
for each identified batch
determining a processing rate associated with the print device;
determining a batch processing time associated with processing the identified batch by dividing the batch size associated with the identified batch by the processing rate;
summing the batch processing times.

7. The method of claim 1, wherein:
determining a low-activity state sustainability metric value comprises determining a low-activity state power usage metric value associated with the print device operating in one or more low-activity states over a period of time;
determining a print shop low-activity state metric comprises determining a print shop low-activity state power usage metric value by summing the low-activity state power usage metric values associated with each print device in the plurality of print devices;
determining a processing state sustainability metric value comprises determining a processing state power usage metric value associated with the print device operating in a processing state over the period of time;
determining a print shop processing state sustainability metric value comprises determining a print shop processing state power usage metric value by summing the processing state power usage metric values associate with each print device in the plurality of print devices; and
determining a print shop sustainability metric value comprises determining a print shop power usage metric value by summing the print shop power usage metric value and the print shop processing state power usage metric value.

8. The method of claim 1, wherein:
determining a low-activity state sustainability metric value comprises determining a low-activity state carbon dioxide emissions metric value associated with the print device operating in one or more low-activity states over a period of time;
determining a print shop low-activity state metric comprises determining a print shop low-activity state carbon dioxide emissions metric value by summing the low-activity state carbon dioxide emissions metric values associated with each print device in the plurality of print devices;
determining a processing state sustainability metric value comprises determining a processing state carbon dioxide emissions metric value associated with the print device operating in a processing state over the period of time;
determining a print shop processing state sustainability metric value comprises determining a print shop processing state carbon dioxide emissions metric value by summing the processing state carbon dioxide emissions metric values associate with each print device in the plurality of print devices; and
determining a print shop sustainability metric value comprises determining a print shop carbon dioxide emissions metric value by summing the print shop carbon dioxide emissions metric value and the print shop processing state carbon dioxide emissions metric value.

9. The system of claim 1, wherein the one or more programming instructions for determining a processing time comprise one or more programming instructions for
identifying a print job to be processed by the print shop during the period of time;
identifying a plurality of batches associated with the print job, wherein each batch has a corresponding batch size;
identifying one or more batches assigned to the print device;
for each identified batch
determining a processing rate associated with the print device;
determining a batch processing time associated with processing the identified batch by dividing the batch size associated with the identified batch by the processing rate;
summing the batch processing times.

10. A system for determining a print shop sustainability metric over a period of time, the system comprising:
a computing device; and
a computer-readable storage medium in communication with the computing device, wherein the computer-readable storage medium comprises one or more programming instructions for:
for each of a plurality of print devices in a print shop, determining a low-activity state sustainability metric value associated with the print device operating in one or more low-activity states over a period of time,
determining a print shop low-activity state sustainability metric value associated with the print shop by summing the low-activity state sustainability metric values associated with each print device in the plurality of print devices, for each print device in the plurality of print devices, determining a processing state sustainability metric value associated with the print device operating in a processing state over the period of time by:
determining a processing time associated with the print device, wherein the processing time comprises an amount of time the print device processes one or more print jobs during the period of time,
determining a processing rate associated with the print device, wherein the processing state rate comprises a measurement of the sustainability metric associated with the print device operating in a processing state over a second period of time, and
multiplying the processing time by the processing rate, determining a print shop processing state sustainability metric value associated with the print shop by summing the processing state sustainability metric values associated with each print device in the plurality of print devices, determining a print shop sustainability metric value by summing the print shop sustainability metric value and the print shop processing state sustainability metric value, and displaying one or more of the low-activity state sustainability metric values, the processing state sustainability metric values, the print shop sustainability metric value, the print shop processing state sustainability metric value and the print shop sustainability metric value.

11. The system of claim 10, wherein the one or more programming instructions for determining a low-activity state sustainability metric value associated with the print device comprise one or more programming instructions for:

determining an idle time associated with the print device, wherein the idle time comprises an amount of time that the print device operates in idle mode over the period of time;

determining an idle rate associated with the print device, wherein the idle rate comprises a measurement of the sustainability metric associated with the print device operating in idle mode over a second period of time;

determining an idle sustainability metric value by multiplying the idle time and the idle rate;

determining a sleep time associated with the print device, wherein the sleep time comprises an amount of time that the print device operates in sleep mode over the period of time;

determining a sleep rate associated with the print device, wherein the sleep rate comprises a measurement of the sustainability metric associated with the print device operating in sleep mode over the second period of time;

determining a sleep sustainability metric value by multiplying the sleep time and the sleep rate;

determining an off time associated with the print device, wherein the off time comprises an amount of time that the print device operates in off mode over the period of time;

determining an off rate associated with the print device, wherein the off rate comprises a measurement of the sustainability metric associated with the print device operating in off mode over the second period of time;

determining an off sustainability metric value by multiplying the off time and the off rate;

summing the idle sustainability metric value, the sleep sustainability metric value and the off sustainability metric value.

12. The system of claim 11, wherein the one or more programming instructions for determining an idle time comprise one or more programming instructions for identifying an amount of time the print device operates in idle mode during the period of time from a schedule associated with the print shop.

13. The system of claim 11, wherein the one or more programming instructions for determining a sleep time comprise one or more programming instructions for identifying an amount of time the print device operates in sleep mode during the period of time from a schedule associated with the print shop.

14. The system of claim 11, wherein the one or more programming instructions for determining an off time comprise one or more programming instructions for identifying an amount of time the print device operates in off mode during the period of time from a schedule associated with the print shop.

15. The system of claim 10, wherein:

the one or more programming instructions for determining a low-activity state sustainability metric value comprise one or more programming instructions for determining a low-activity state power usage metric value associated with the print device operating in one or more low-activity states over a period of time;

the one or more programming instructions for determining a print shop low-activity state metric comprise one or more programming instructions for determining a print shop low-activity state power usage metric value by summing the low-activity state power usage metric values associated with each print device in the plurality of print devices;

the one or more programming instructions for determining a processing state sustainability metric value comprise one or more programming instructions for determining a processing state power usage metric value associated with the print device operating in a processing state over the period of time;

the one or more programming instructions for determining a print shop processing state sustainability metric value comprise one or more programming instructions for determining a print shop processing state power usage metric value by summing the processing state power usage metric values associate with each print device in the plurality of print devices; and the one or more programming instructions for determining a print shop sustainability metric value comprise one or more programming instructions for determining a print shop power usage metric value by summing the print shop power usage metric value and the print shop processing state power usage metric value.

16. The system of claim 10, wherein:

the one or more programming instructions for determining a low-activity state sustainability metric value comprise one or more programming instructions for determining a low-activity state carbon dioxide emissions metric value associated with the print device operating in one or more low-activity states over a period of time;

the one or more programming instructions for determining a print shop low-activity state metric comprise one or more programming instructions for determining a print shop low-activity state carbon dioxide emissions metric value by summing the low-activity state carbon dioxide emissions metric values associated with each print device in the plurality of print devices;

the one or more programming instructions for determining a processing state sustainability metric value comprise one or more programming instructions for determining a processing state carbon dioxide emissions metric value associated with the print device operating in a processing state over the period of time;

the one or more programming instructions for determining a print shop processing state sustainability metric value comprise one or more programming instructions for determining a print shop processing state carbon dioxide emissions metric value by summing the processing state carbon dioxide emissions metric values associate with each print device in the plurality of print devices; and the one or more programming instructions for determining a print shop sustainability metric value comprise one or more programming instructions for determining a print shop carbon dioxide emissions metric value by summing the print shop carbon dioxide emissions metric value and the print shop processing state carbon dioxide emissions metric value.

* * * * *